United States Patent [19]

Abate et al.

[11] Patent Number: 4,980,876
[45] Date of Patent: Dec. 25, 1990

[54] SINGLE STAGE TRACK SEEK METHOD

[75] Inventors: Charles Abate, San Jose; Robert Jackson, Union City, both of Calif.

[73] Assignee: Maxoptix Corporation, San Jose, Calif.

[21] Appl. No.: 252,768

[22] Filed: Oct. 3, 1988

[51] Int. Cl.⁵ .............................................. G11B 7/085
[52] U.S. Cl. .............................. 369/44.11; 360/78.06; 360/78.07; 360/78.08
[58] Field of Search ........................ 369/32, 33, 43–47, 369/44.11, 44.25; 360/77.01, 77.02, 77.04, 77.11, 78.01, 78.04, 78.06, 78.07, 78.08

[56] References Cited

U.S. PATENT DOCUMENTS 4,532,562  7/1985  Powell ................................ 360/78.07
4,697,127  9/1987  Stich et al. ........................ 360/78.06

*Primary Examiner*—Robert L. Richardson
*Attorney, Agent, or Firm*—Hecker & Harriman

[57] ABSTRACT

A seek method for disk drive is described. In the seek method of the present invention, the tracking servo loop remains in a track positioning mode throughout the entire seek process. By effectively varying the reference position of the head with respect to track center under a predetermined profile, the track positioning mode is utilized to produce a pseudo-continous movement across the disk surface. In essence, the servo track following loop attempts to mainta position relative to a local track center as dictated by profile information supplied by a microprocessor. The system of the present invention is an open loop in the sense that no attempt is made to loop information about deviation from the predefined profile back to the microprocessor. Local positioning, however, remains closed loop at all times so that the system is always within the predicted track and arrives directly on target.

8 Claims, 3 Drawing Sheets

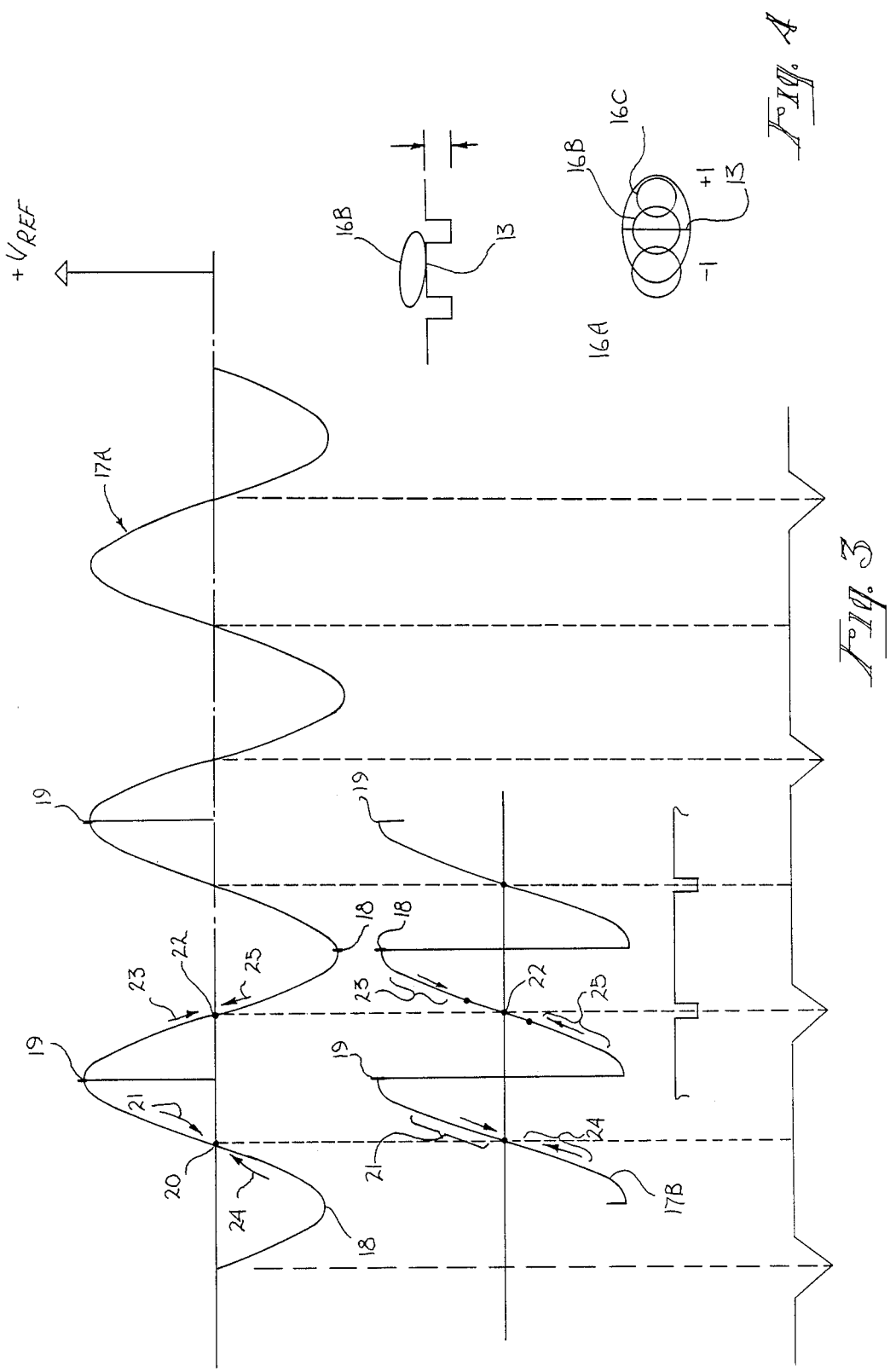

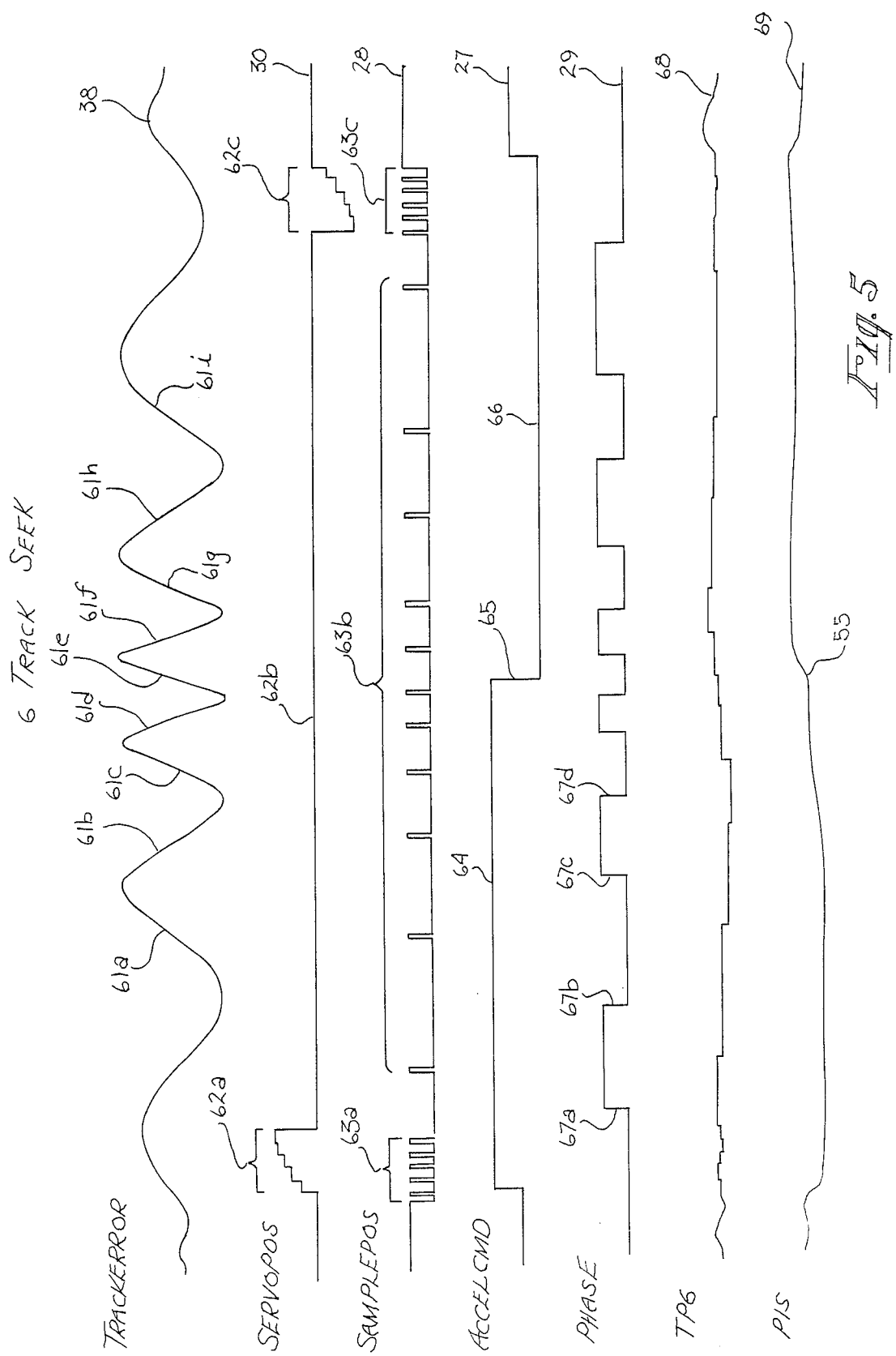

SINGLE STAGE TRACK SEEK METHOD

BACKGROUND OF THE PRESENT INVENTION

1. Field of the Invention

This invention relates to the field of method and apparatus for executing seeks in a disk drive environment.

2. Background Art

Mass storage for computer systems is typically provided by a magnetic or optical media storage system, such as rigid or flexible disk storage systems. In a magnetic system, a rotating disk having a magnetic media layer on the surface is accessed by a "read/write" head which is used to store and retrieve information from the disk surface. To store information on a magnetic media disk, flux reversals are induced in the magnetic particles comprising the disk's surface. When a magnetic read/write head is passed over the flux reversals, a signal is induced in the head which can be decoded to convey information stored on the disk.

In a preformatted or write once, optical disk drive, data is stored as a series of pits arranged in concentric or spiral tracks on a disk surface. The read/write head is replaced by a lens assembly which is used to project a light beam, (such as a laser beam), onto the disk surface. The light beam is modulated by the pits in the disk and the modulated light beam is reflected from the disk to an optical pick up device which can produce an output signal dependent on the modulation of the light beam. In a magneto-optical disk drive, magnetic domains are oriented so that the polarization of a read light beam is modulated and this modulated beam is detected. In an optical disk drive, a movable lens assembly is mounted on a relatively large base carriage. The base carriage is moved back and forth in a radial direction relative to the optical disk. The lens assembly moves radially relative to the disk and relative to the base carriage.

In the present application, "read/write" head will be used interchangeably with the magnetic head of the magnetic medium drive or the lens assembly of the optical drive. A read/write head refers to any suitable means for accessing or providing data to a storage medium.

In the prior art, data is arranged on a disk in a series of concentric "tracks". For read/write operations, a movable read/write head is selectably positioned over one of the tracks and used to write or retrieve data from the disk surface. Each of the tracks is divided into sectors. Each sector of each track of the disk is a memory address location which can be accessed by control software for data storage and retrieval. When the disk drive system receives a request for information, or when it is writing information to a particular address, the read/write head must be moved from its present location to the desired track and sector location. The movement of the read/write head from one position to a destination position is known as a "seek". Because information is written to and from the disk surface in a random fashion, it is generally necessary to perform a number of seeks during each disk access. Seek operations take up the majority of the execution time of a disk access operation. Therefore, drive performance is directly dependent on seek efficiency.

In the prior art, a seek is executed in two stages. The first "coarse positioning" stage is used to move the read/write head into the general destination area of the seek. At the completion of the first coarse stage, a second "fine positioning" stage is implemented to position the read/write head directly over the desired track. A disadvantage of this prior art system is that two seek stages are required. This adds to the time of the seek, reducing drive efficiency. Further, the first stage may result in the read/write head being positioned as many as a hundred tracks away from the desired destination track. Because the fine positioning stage requires small steps to be accurate, the length of the fine positioning stage is increased.

In a prior art seek method for an optical drive, the base carriage is accelerated at the beginning of the seek for coarse positioning. As the base carriage moves the lens assembly across the disk, the lens assembly is utilized to count track crossings on the disk or on a base mounted reference scale. When the count indicates that the appropriate track location is reached, the base carriage is stopped and track following circuitry is utilized to position the lens assembly to lock onto the desired track. Further, by relying on the disk surface to provide position information during the seek (by counting track crossings) the prior art seek method is sensitive to flaws in the disk media. Such flaws may indicate a track crossing where none in fact exists resulting in incorrect positioning of the lens assembly.

Therefore, it is an object of the present invention to provide a seek method in which a seek can be executed in a single stage.

It is another object of the present invention to provide a seek method in which a single control loop executes the seek operation.

It is yet another object of the present invention to provide a seek method in which track following circuitry controls the seek.

It is still another object of the present invention to provide a seek method which is independent of media defects.

SUMMARY OF THE PRESENT INVENTION

A seek method for disk drives is described. In the seek method of the present invention, the tracking servo loop remains in a track positioning mode throughout the entire seek process. By effectively varying the reference position of the head with respect to track center under a predetermined profile, the track positioning mode is utilized to produced a pseudo-continuous movement across the disk surface. In essence, the servo track following loop attempts to maintain position relative to a local track center as dictated by profile information supplied by a microprocessor. The system of the present invention is an open loop in the sense that no attempt is made to loop information about deviation from the predefined profile back to the microprocessor. Local positioning, however, remains closed loop at all times so that the system is always within the predicted track and arrives directly on target.

In operation, the servo head is accelerated across the disk with acceleration rate, time of seek and maximum velocity established pursuant to a seek profile. The seek profile may be calculated in real time or stored in a look-up table. The seek profile includes the sinusoidal position error function used for track following. During the initial stages of the seek operation, a large number of samples of position information are taken and compared to the seek profile. In the present invention, the sinusoidal position error signal of the head relative to a track center is utilized and compared to an ideal profile. The difference between the ideal profile and the actual position is used to drive the track following circuitry to maintain the seek on a desired profile. Once the track crossing rate approaches the sample rate, samples are taken less frequently with respect to position, typically once every track crossing. As the seek nears its end, the sample rate is again increased so that the heads may be moved into position on the desired track with no fine positioning required.

BRIEF DESCRIPTION OF THE DRAWINGS

FIG. 3 is a timing diagram illustrating a sample of the seek method of the present invention.

FIG. 4 illustrates the tracking spot of an optical drive system.

FIG. 5 is a timing diagram of a six track seek.

DETAILED DESCRIPTION OF THE PRESENT INVENTION

Figure 1:
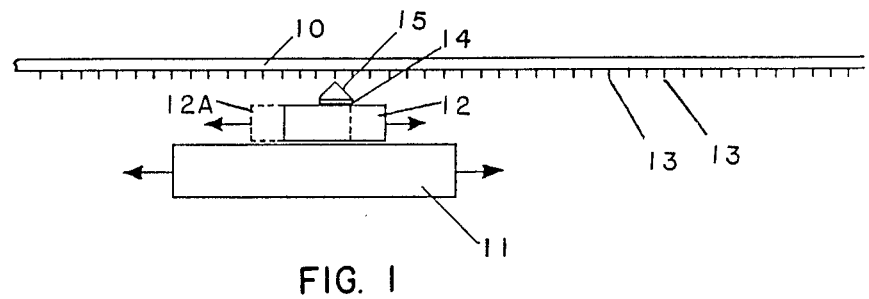
FIG. 1 is a view of a lens assembly and base carriage of an optical drive system.

A method and apparatus for performing seeks on a disk drive is described. In the following description, numerous specific details, such as sample rate, etc., are set forth in order to provide a more thorough understanding of the present invention. It will be apparent, however, to one skilled in the art, that the present invention may be practiced without these specific details. In other instances, well known features have not been described in detail in order not to unnecessarily obscure the present invention.

The present invention provides a method and apparatus for performing seeks in a single stage, reducing the time of the seek. The present invention also provides for more accurate seeks by substantially eliminating the effects of media defects.

A typical disk drive generally has two control modes, coarse positioning and track following (fine positioning). The coarse positioning mode is a closed loop control mode used during the first stage of prior art two stage seeks. During this stage, the head is subjected acceleration from a starting point in the direction of a desired ending track. Track crossings are counted and fed back to the control loop to control the speed and acceleration of the head assembly. However, media defects, particularly in optical drives, may indicate the presence of a track crossing when none in fact, exists. In addition, a media defect may mask a track crossing. As a result, at the end of the coarse stage, the head may be off by many tracks from the desired location.

The second control mode is a track following mode. In the track following mode, the amplitude of the signal detected by the head assembly is sampled. When the head assembly is directly over track center, the amplitude of the received signal is at its smallest magnitude. As the head moves toward a track boundary, the magnitude of the amplitude increases. At the end of the first stage of a prior art seek, control is shifted over to a track following mode. The head is then centered on the nearest track and sector and other servo information is read to determine the number of the track. Once the actual track position is established, the track following circuitry is used to move the head, typically one track at a time, to the desired track location. At that point, the head assembly is then centered on the track and servo and sector information is read to determine head position.

In track following mode, the amplitude of the detected signal as the heads move across tracks defines a sinusoid which is a function of disk radius. By comparing the amplitude of the received signal to the amplitude at the track signal, an offset error signal can be calculated which can be used to drive the head positioning motor such that the head becomes centered on the desired track. The track following circuitry continuously and automatically attempts to center the heads over the desired track.

The present invention takes advantage of this fact by providing a seek method which utilizes only the track following control loop. During a seek using the method of the present invention, the drive remains in track following mode. During the seek, samples of the sinusoidal position function are taken and compared to an ideal value based on the seek profile. The track following circuitry is utilized to attempt to drive the head to the desired point on a sinusoid signal. During the constant velocity stage of the seek operation, the samples are taken at longer intervals with respect to position, sufficient to maintain the head on the desired seek profile. At the end of the seek, during the deceleration of the head, samples are taken more frequently with respect to position to insure that the stop point of the head is over the desired track. Because the seek method of the present invention is not dependent on counting tracks, media defects do not affect the accuracy of the seek.

The position error signal is a sinusoidal function of radius and the sense of the error signal is such that the gradient of the sinusoid can be used to correct centering errors. For a seek operation a plot of the gradient values of the track crossing sinusoid at all points in the seek trajectory is calculated. During the seek, the track crossing error is periodically sampled and compared to the calculated values. Any differences between the actual and projected values are used to generate an offset error signal which is combined with the position actuator drive signal to compensate for variations from the desired trajectory. If a media defect is encountered, the control circuitry of the present invention ignores it. The high sampling rate of the present seek method allows such defects to be ignored without affecting the accuracy of the seek.

The present invention also permits improvements in rotational latency. Latency is the time it takes to access a desired track sector after the track has been reached at the end of a seek. Typically, when a seek is completed, it is necessary to wait until the sector index rotates beneath the head for sector position to be established. This is due to the fact that in a prior art seek, errors introduced in the coarse positioning stage make it impossible to predict a landing sector of a seek. In the single stage seek of the present invention, however, the landing sector is known prior to the beginning of the seek. Thus, it is not necessary to wait until the index is encountered to establish sector position.

The preferred embodiment of the present invention is employed in an optical disk drive. In an optical disk system, an optical disk having pre-formatted tracks is employed. Pits in the surface of the disk are used to modulate a light beam projected onto the disk so that the reflected laser beam conveys information stored on the disk. In an optical disk drive, the read/write head comprises a lens used to focus a light beam onto the surface of the disk. Movement of the lens of the disk drive is accomplished through two mechanisms. These two mechanisms are illustrated in FIG. 1.

A movable base carriage 11 is exposed beneath the surface of an optical disk 10. The base carriage moves back and forth in a radial direction with respect to the disk 10. The base carriage may be mounted on tracks or rollers (not shown) and driven by an actuator motor.

Mounted on the base 11 is a lens assembly 12. The lens assembly 12 includes a lens 14 used to focus a light beam 15 on a track 13 of the disk surface. The lens assembly 12 also moves radially with respect to the disk 10. In addition, the lens assembly 12 moves back and forth with respect to the base 11. For example, as shown by phantom line 12a, the lens assembly 12a may be moved towards one end or the other of the base carriage 11. In the prior art, the lens assembly 12 is utilized for fine positioning of the light beam 15. After the base carriage 11 has moved into the approximate area of the desired track, the lens assembly is moved back and forth until the desired track is reached. The base carriage is then moved so that the lens assembly 12 will be positioned in a nominal "center" position with respect to the base carriage 11. Please note that that FIG. 1 is a representational drawing and is not drawn to scale.

Separate control loops control the base carriage 11 and the lens assembly 12. The controller of the lens assembly 12 is used for track following. Whether in a seek or a disk access mode, the control circuitry of the base carriage attempts to maintain the lens assembly 12 in the nominal center of the base carriage 11.

The lens of an optical disk drive is used to focus a beam of light on the disk surface. A top view of this focus spot of the present invention is illustrated in FIG. 4. Focus spot 16b illustrates the position of the focus spot at the nominal track center 13. When the lens assembly becomes off center, the focus spot moves left and right as shown by focus spot 16a and 16c respectively. As the focus spot moves across the disk, it crosses track boundaries on the optical disk. The variations in the reflected beam due to the difference in distance travelled by a focus spot on center and a focus spot off center is used to determine track position and controls track following. A plot of the signal received as the focus spot crosses track boundaries is illustrated in FIG. 3.

Signal 17a represents the signal derived as the focus spot moves across the disk and crosses track boundaries. When the focus spot is on track center and half way between track centers, the signal 17a has its minimum amplitude as shown at points 20 and 22. As the spot moves away from the track center toward track boundaries, the amplitude increases. This point of maximum amplitude is shown at points 18 and 19.

The zero crossings of signal 17a, such as, for example, points 20 and 22, represent the location of the focus spot on track center and half way between track centers. As signal 17a moves from point 18 to point 19, the gradient of the signal converges at a zero crossing as shown at point 20. The convergence of the gradient at that point is shown by gradient sections 21 and 24. From point 19 to point 18, the gradient diverges from the zero crossing point 22, as shown by sections 23 and 25. This gradient switch occurs every half track.

By implementing a polarity reversal each half track, the sense of the gradient may be made consistent. Referring now to signal 17b, the phase of the signal is reversed each half track at points 19 and 18. As shown in signal 17b, the sense of the gradient sections 21, 23, 24, and 25 are consistent.

In operation, the present invention initializes movement of the lens assembly 12 to begin a seek operation. The base carriage automatically begins moving so as to center the lens assembly with respect to the base carriage. In the prior art, only the base carriage is initialized at the beginning of a seek, while the lens assembly is disabled. This slows the seek down since the inertia of the heavier base carriage limits its start up responsiveness.

After the lens assembly is initialized, samples of the track position are taken at frequent intervals. For example, during the early part of a seek in the preferred embodiment of the present invention, the sample rate is approximately 40 k Hz. These sample data points are compared to ideal sample points previously calculated and stored as a look up table. Although the ideal sample points can be calculated "on the fly" in real time, computation requirements are reduced by utilizing a look up table, permitting a higher sample rate.

After the initial start up phase, the sample rate is reduced and samples are taken only at the predicted zero crossing locations of the focus spot. At the end of the seek, the sample rate is again increased so that the seek will end precisely on the center of the desired track.

The signal derived for tracking error purposes is a sinusoidal function of radius and is represented as follows:

$$f(r) = A \sin\left(\frac{2\pi r}{P}\right) + B \qquad \text{(Equation 1)}$$

Where
 f(r)=tracking error signal as a function of radius
 r=radial distance from a starting point.
 P=track pitch.
 A and B are constants for scaling purposes.

Radial acceleration is a sequence of step functions with a finite time constant based on the system parameters and is modelled as follows:

$$\ddot{r} = a\left(1 - e^{\frac{-t}{\tau}}\right) \qquad \text{(Equation 2)}$$

Where:
 a=steady state acceleration
 $\tau$=system time constant
It follows that radial velocity is given by:

$$\dot{r} = a\int_0^t \left(1 - e^{\frac{-t}{\tau}}\right)dt = a\left(t + \tau e^{\frac{-t}{\tau}} - \tau\right) \qquad \text{(Equation 3)}$$

Therefore the position signal is given by the following equation:

$$r = \int_0^t \dot{r}\,dt = a\left(\frac{t^2}{2} - \tau t + \tau^2\left(1 - e^{\frac{-t}{\tau}}\right)\right) \qquad \text{(Equation 4)}$$

By substituting the position expression of Equation 4 in Equation 1, the error signal may be expressed as a function of time more suitable for the crystal referenced timers of microprocessors. Therefore:

$$f(t) = \sin\left(\frac{2\pi a}{P}\right)\left[\frac{t^2}{2} - \tau t + \tau^2\left(1 - e^{\frac{-t}{\tau}}\right)\right] + B \quad \text{(Equation 5)}$$

The sample rate for the second mode of the seek, where only zero crossings are sampled, is calculated on an incremental basis using a standard equation of motion of a system having constant acceleration. This can be expressed as follows:

$$\Delta r = r_0 \Delta t + \frac{a}{2} \Delta t^2 \quad \text{(Equation 6)}$$

Where
$r_o$=initial velocity
$\Delta r$=incremental distance between function zeros
$\Delta t$=time interval between zeros.
The positive root of the quadratic expression, solved for t, yields:

$$\Delta t = \frac{1}{a}((r_0^2 + 2a\Delta r) - r_0) \quad \text{(Equation 7)}$$

The next interval is calculated using the new initial velocity.

$$r_{o_{n+1}} = r_{o_n} + a\Delta t \quad \text{(Equation 8)}$$

As velocity increases, the number of sinusoid cycles between samples increases due to restrictions on maximum sample rate so the general expression for incremental radial displacement is $$\Delta r = nP - e \quad \text{(Equation 9)}$$

Where
n=number of cycles (tracks) per sample
e=error term due to timer resolution.

The error term is calculated by taking the difference between the required incremental displacement and that obtained by rounding the time interval to the available resolution of the timer. This prevents the rounding error from being a cumulative effect. The displacement error for each interval is then the difference between the actual displacement and the target displacement, which, in turn, is the difference between a present multiple of track pitch and the previous displacement error as follows.

$$e_n = \Delta r_a - (nP - e_{n-1}) \quad \text{(Equation 10)}$$

Where $\Delta r_a$=actual displacement corresponding to the rounded time interval.

The steady state acceleration term "a" above is a function of moving mass, motor force constant and available drive current as dictated by power constraints. The maximum steady state acceleration is obtained from:

$$a = \frac{IK_a}{m} \quad \text{(Equation 11)}$$

Where
I=average steady state current to coarse actuator under constant acceleration.

$K_a$=coarse actuator force constant.
m=moving mass.

As velocity increases, only the zero points corresponding to full track or multiple track widths are sampled so that the polarity signal need not be switched.

Figure 2:
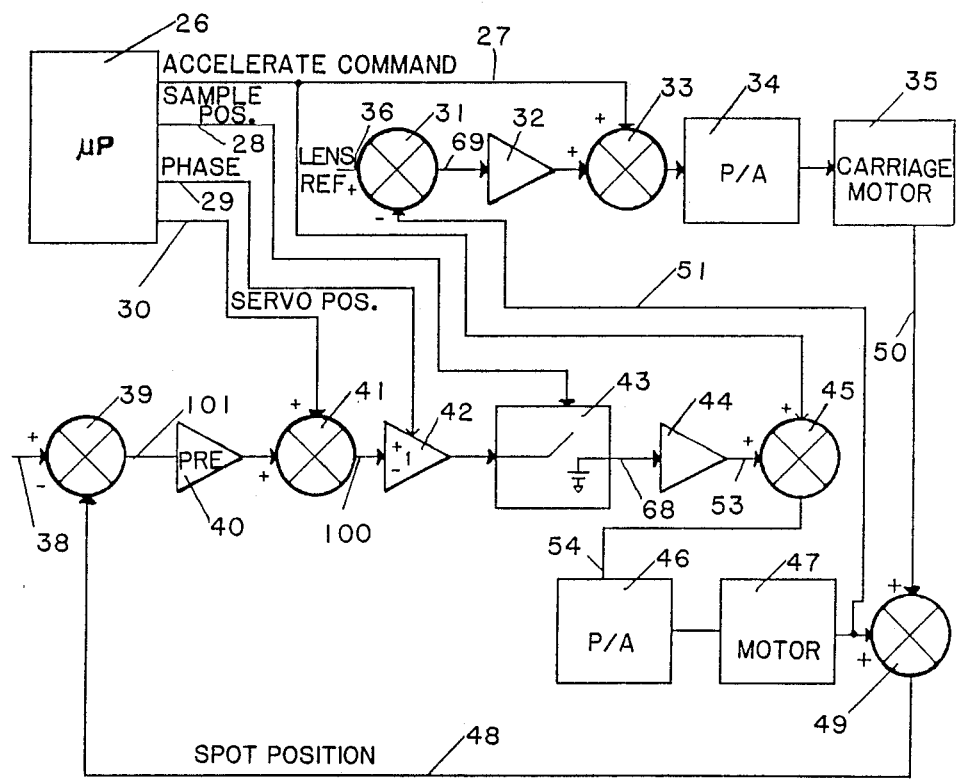
FIG. 2 is a block diagram of the control loop of the present invention.

A block diagram of the control circuit of the preferred embodiment of the present invention is illustrated in FIG. 2. The microprocessor 26 provides profile information for the seek operation. In the preferred embodiment of the present invention, four signal outputs of the microprocessor 26 are used to control the seek operation. These outputs are ACCELERATE COMMAND 27, SAMPLE POSITION 28, PHASE 29 and SERVO POSITION 30. The system is not continuous during the seek operation but is sample driven, therefore SAMPLE POSITION signal 28 controls the sampling rate of the circuitry. The coarse positioning mechanism is represented by the control loop beginning with the lens reference signal 36. As the lens assembly 12 moves back and forth with respect to the base carriage 11, a lens position signal 51 is generated representing the amount of displacement of the lens assembly from the nominal center position. This lens position signal is coupled through difference amplifier 31 to generate output signal 69. Output signal 69 is coupled through compensation amplifier 32 to summing amplifier 33. The output of summing amplifier 33 is coupled to power amplifier 34. Power amplifier 34 provides a drive signal to the carriage motor 35 to move the base carriage 11 such that the lens assembly 12 is in the nominal center position.

The groove position signal 38 is a sinusoidal function derived from the formatted grooves in the disk media. This signal 38 is coupled to difference amplifier 39. The output of difference amplifier 39 is coupled through preamplifier 40 to summing amplifier 41, where it is combined with the SERVO POSITION signal 30. The output 100 of summing amplifier 41 represents the difference between the actual spot position and the ideal spot position with respect to the groove at that sample point. The signal 100 is coupled to an Inverting or Non-Inverting Amplifier 42 where it is multiplied by +1 or −1, dependent on the PHASE signal 29. The output of amplifier 42 is coupled through a sampler 43 to compensator 44. Sampler 43 is controlled by SAMPLE POSITION signal 28 and is closed only at the desired sample times.

The output of compensator 44 is coupled to summing amplifier 45 along with the ACCELERATE COMMAND signal 27. The signal 53 represents the offset signal necessary to keep the spot on the desired seek profile. The output 54 of summing amplifier 45 is coupled to power amplifier 46. The output of power amplifier 46 drives lens assembly motor 47.

The output 51 of motor 47 is coupled to summing amplifier 49 along with the output 50 of carriage motor 35. The output 48 of summing amplifier 49 is a SPOT POSITION signal. The SPOT POSITION signal is combined with the groove position at differencing amplifier 39 at the beginning of the fine pssition loop.

The output 51 of lens motor 47 is also coupled to differencing amplifier 31 along with a lens reference signal 36. The output 69 of differencing amplifer 31 represents the position of the lens assembly with respect to the nominal center of the base carriage.

In operation, the ACCELERATE command signal is used to provide an open loop acceleration to reduce the gain requirements of the track following loop. The track following loop needs only to make up differences between the actual physical acceleration and the theoretical demand. The ACCELERATE command signal is also coupled to the base carriage 11 for the same reason to keep the base carriage within the range of the lens assembly 12.

During the initial stages of the seek operation, the SERVO POSITION signal 30 outputs a number of calculated voltages of the error signal at a high sample rate. These calculated values are compared to the actual signal generated by the lens assembly during its movement. If the difference between these signals is zero, no correction to the ACCELERATE COMMAND signal 27 is required. Otherwise, the sample difference signal accelerates or decelerates the lens assembly, to get the system back on the desired trajectory. At higher velocities, the sample rate is reduced to one per track crossing to simplify the control process. At high velocity, every other zero crossing is sampled, or multiples of zero crossings. Since every other zero crossing has the same polarity, there is no need to reverse the polarity. Therefore, during this stage of operation, the PHASE signal 29 is disabled. As the head is decelerated, the sample rate is increased so that the head may be guided onto the desired track.

Timing diagrams from several signals for a sample seek are illustrated in FIG. 5. The sample chosen is a six track seek. The signals correspond to signals in the block design of FIG. 2. The track error signal 101 represents the position of the head with respect to track centers during the seek operation. SERVO POSITION signal 30 is the ideal position of the spot relative to the track at selected sample points during the seek.

The SAMPLE POSITION signal 28 represents the sample times at which the actual head position given by the track error signal 101 is compared to the ideal head position given by servo position signal 30. The ACCELERATE COMMAND signal 27 represents the drive signal provided to the drive motor during the seek operation. The PHASE signal 29 controls the sense of the track error signal, depending on whether the head is on the rising or falling edge of the signal.

Signal 68 corresponds to the seek error signal output of sampler 43 of FIG. 2. LPS signal 69 is a lens position signal representing the position of the lens assembly relative to the base carriage.

During the initial stages of the seek, samples are taken at a high rate as shown at area 63a of sample position 38. Correspondingly, ideal seek profile values are calculated as shown by section 62a of servo position signal 30. In the example shown, the high sample rate is maintained during the first rising edge of the track error signal 101. At that point, the sample rate is reduced to once per predicted zero crossing of the track error signal. These zero crossings are shown by points 61a–61i of signal 101. In each seek, the samples are taken at every zero crossing, so the phase must be corrected for every other sample to ensure that the correction factor is consistent. Therefore, the phase signal 27 is inverted just prior to each zero crossing as shown at edges 67a–67d of signal 29.

The difference between the trajectory represented by SERVO POSITION signal 30 and the actual trajectory as represented by the track error signal 38 is given by seek error signal 68. As can be seen in the example shown, adjustments made at each of the sample points permit the seek error signal to be limited to a small area around the ideal profile. The higher sample rate at the end of the seek allows the head to be guided to the desired track at the end of the seek with no second stage of fine positioning required.

LPS signal 69 represents the position of the lens assembly with respect to the base carriage. In the initial half of the seek, to the left of point 55 of signal 69, the base carriage lags the lens asembly. As noted previously, the lens assembly is accelerated at the beginning of the seek and the base carriage then begins moving to attempt to center the lens so as to be at the normal center position. Because the lens assembly is subjected to maximum acceleration, the base carriage lags the lens assembly during the initial stage of the seek. During the second portion of the seek, when the lens assembly is decelerating, the base carriage leads the lens assembly until the end of the seek, when the lens assembly is in the nominal center position of the base carriage.

Referring again to FIG. 2, it can be seen that the seek operation is essentially an open-loop operation. In other words, the ACCELERATE COMMAND 27 for the ideal seek profile is not altered during the seek. No position information is fed back to the microprocessor 26 to alter the ACCELERATE COMMAND signal. Instead, the track following loop is used to adjust the position of the lens assembly relative to the track center during the seek operation. The coarse positioning loop is a closed loop operation used to align the base carriage relative to the lens assembly in a nominal center position. However, this operation is performed automatically whether the lens assembly is in the seek mode or not. The result is a seek operation that is faster than prior art seeks in that only a single stage seek is required. In addition, because the ending sector information can be known, latency times are reduced and performance is improved.

Although the present invention has been discussed in terms of an optical disk drive system, it can easily be applied to other types of disk drives, such as magnetic media disk drives. In such an operation, the track following circuitry of the actuator arm motor is utilized to control the seek. As with the optical drive, a seek profile of the track error signal is generated. The position of the head during the seek with respect to a track center is determined and compared to the ideal track error profile. In a magnetic media disk drive, there is not a separate base carriage and head assembly. Rather, the head is coupled to an actuator arm which is driven by a voice coil actuator motor. In the magnetic media system, an ACCELERATE COMMAND signal is provided to the voice coil actuator and track error signal information is provided to the track following loop. The ACCELERATE COMMAND signal itself is not altered so that the seek operation is an open loop operation. However, the track following loop compensates for deviations from the ideal profile.

Thus, an improved seek method has been described.

What is claimed is:

1. In a disk storage system having a plurality of tracks on a rotating disk and accessed by at least one read/write head, a method of performing a seek operation in which said head is moved from a starting track to an end track, said method comprising the steps of:

determining seek parameters for said seek, said parameters including the desired position of said head with respect to a track center position for a plurality of sample times during said seek at a first sample rate;

providing an acceleration signal to accelerate said head in the direction of said end track;

determining at a sample rate dependent on a track crossing rate the actual position of said head with respect to a track center at each of a plurality of user-defined sample times;

comparing said desired position of said head with said actual position;

generating a first control signal representing a difference between said actual position and said desired position;

combining said control signal and said acceleration signal to change said acceleration in response to said first control signal such that said actual position of said head matches said seek parameters.

2. The method of claim 1 further including the steps of:

at a first user-determined time, reducing the acceleration of said head such that said head moves at a constant velocity;

periodically determining the position of said head with respect to a track center at a second user-determined sample rate;

comparing said desired head position with said actual position to generate said first control signal.

3. The method of claim 1 further including the steps of:

at a second user-determined time, decelerating said head;

determining the position of said head with respect to a track center at said first sample rate;

comparing said desired head position to said actual head position to generate said first control signal.

4. The method of claim 1 wherein said first sample rate is greater than said second sample rate.

5. The method of claim 1 wherein said first control signal is generated utilizing track following circuitry.

6. The method of claim 1 wherein said head comprises a lens assembly of an optical disk drive system, mounted on a base carriage assembly.

7. The method of claim 6 further including the steps of:

defining a nominal center position of said lens assembly relative to said base carriage;

accelerating said base carriage such that said lens assembly is at said nominal center position with respect to said base carriage.

8. In an optical disk storage system having a plurality of tracks on a rotating disk and accessed by at least one read/write head, said read/ write head comprising a lens assembly mounted on a base carriage, a circuit for controlling the lens assembly during a seek operation, in which said head is moved from a starting track to an end track, said circuit comprising:

a microprocessing means for generating an acceleration signal for accelerating said lens assembly in the direction of said end track;

first combining means for combining a first signal representative of the position of said head during said seek with respect to a track center position and a desired position of said head with respect to said track enter, said first comparing means providing a first output signal representative of a difference between said desired head position and said actual head position;

sampling means coupled to said first combining means and said processing means for sampling said difference signal at one of a plurality of userdetermined sample rates, said sampling means providing a second output signal to;

a first motor means coupled to said lens assembly and to said second output signal for moving said lens assembly in the direction of said end track;

a second combining means coupled to said first motor and a second input signal representative of the difference between an actual lens position and a nominal lens position relative to said base carriage;

said second combining means outputting a fourth output signal;

third combining means coupled to said fourth output signal and said acceleration signal;

said third combining means providing a fifth output signal;

a second motor coupled to said fifth output signal and said base carriage for moving said base carriage in response to said fifth output signal.

* * * * *